(12) United States Patent
Messere

(10) Patent No.: US 10,190,359 B2
(45) Date of Patent: Jan. 29, 2019

(54) DOUBLE GLAZING HAVING IMPROVED SEALING

(71) Applicant: SAINT-GOBAIN GLASS FRANCE, Courbevoie (FR)

(72) Inventor: Rino Messere, Modave (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 79 days.

(21) Appl. No.: 15/038,356

(22) PCT Filed: Dec. 5, 2014

(86) PCT No.: PCT/EP2014/076736
§ 371 (c)(1),
(2) Date: May 20, 2016

(87) PCT Pub. No.: WO2015/086457
PCT Pub. Date: Jun. 18, 2015

(65) Prior Publication Data
US 2016/0290033 A1    Oct. 6, 2016

(30) Foreign Application Priority Data
Dec. 12, 2013    (EP) .................................... 13196866

(51) Int. Cl.
*E06B 3/663*    (2006.01)
*E06B 3/673*    (2006.01)

(52) U.S. Cl.
CPC ...... *E06B 3/66342* (2013.01); *E06B 3/66352* (2013.01); *E06B 3/673* (2013.01); *E06B 3/6733* (2013.01); *Y02B 80/22* (2013.01)

(58) Field of Classification Search
CPC ............. E06B 3/66342; E06B 3/66252; E06B 3/66352; E06B 3/673; E06B 3/6772; Y02B 80/22
See application file for complete search history.

(56) References Cited

U.S. PATENT DOCUMENTS 2,094,381 A    9/1937    Slayter
2,303,897 A    12/1942    Smith
(Continued)

FOREIGN PATENT DOCUMENTS

CA    2275448 A1    7/1998
CN    1377329 A    10/2002
(Continued)

OTHER PUBLICATIONS

Final Office Action for U.S. Appl. No. 14/942,092, filed Nov. 16, 2015 on behalf of Walter Schreiber, dated Sep. 26, 2016. 29 pages.
(Continued)

*Primary Examiner* — Donald J Loney
(74) *Attorney, Agent, or Firm* — Steinfl + Bruno, LLP

(57) ABSTRACT

A double glazing having a first pane and a second pane, and a spacer between the first pane and the second pane is described. The spacer has a glazing interior surface, an external surface and two pane contact surfaces; a glazing interior bordered by the inner faces of the first pane and of the second pane and the glazing interior surface of the spacer; an external intermediate space between the panes adjacent to the first pane, the second pane, and the external surface.

14 Claims, 4 Drawing Sheets

(56) References Cited

U.S. PATENT DOCUMENTS

Figure 1:
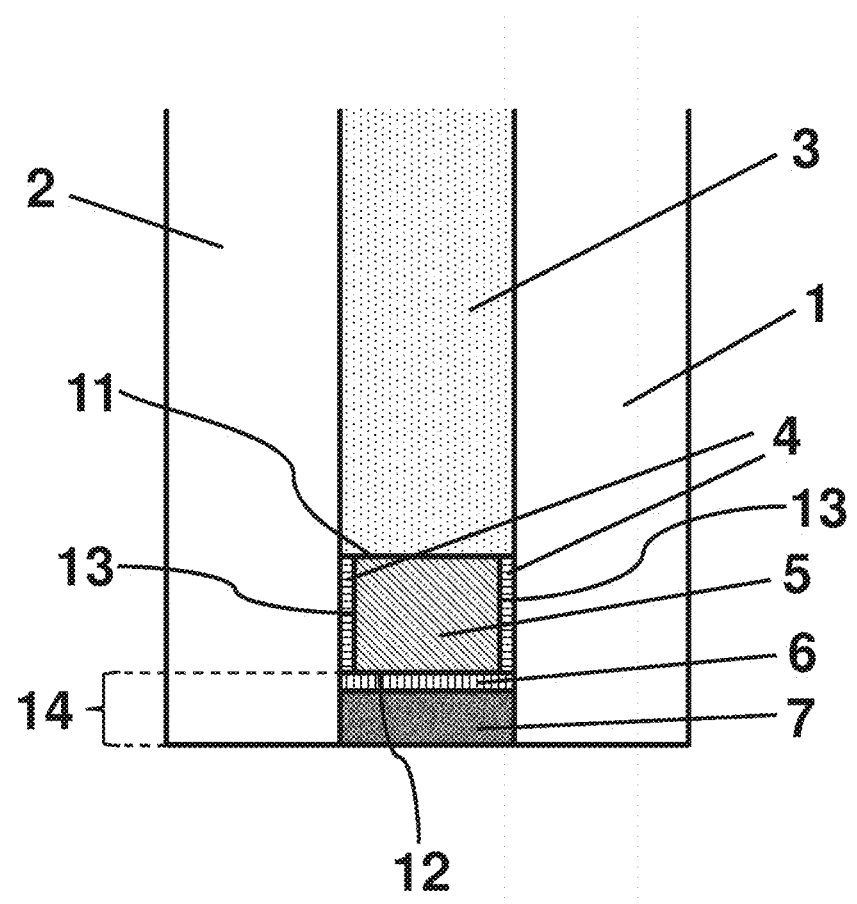

| | | | |
|---|---|---|---|
| 2,834,999 A | 5/1958 | Taylor et al. | |
| 3,168,089 A | 2/1965 | Larkin | |
| 3,793,276 A * | 2/1974 | Blunt et al. | C08L 63/00 523/450 |
| 3,935,683 A | 2/1976 | Derner et al. | |
| 3,998,680 A | 12/1976 | Flint | |
| 4,080,482 A | 3/1978 | Lacombe | |
| 4,109,431 A | 8/1978 | Mazzoni et al. | |
| 4,198,254 A | 4/1980 | Laroche et al. | |
| 4,226,063 A | 10/1980 | Chenel | |
| 4,479,988 A | 10/1984 | Dawson | |
| 4,613,530 A | 9/1986 | Hood et al. | |
| 4,658,553 A | 4/1987 | Shinagawa | |
| 4,799,745 A | 1/1989 | Meyer et al. | |
| 4,831,799 A | 5/1989 | Glover et al. | |
| 5,007,217 A | 4/1991 | Glover et al. | |
| 5,071,206 A | 12/1991 | Hood et al. | |
| 5,079,054 A | 1/1992 | Davies | |
| 5,125,195 A | 6/1992 | Brede | |
| 5,173,800 A | 12/1992 | King | |
| 5,209,034 A | 5/1993 | Box et al. | |
| 5,270,092 A | 12/1993 | Griffith et al. | |
| 5,290,611 A | 3/1994 | Taylor | |
| 5,302,425 A | 4/1994 | Taylor | |
| 5,313,762 A | 5/1994 | Guillemet | |
| 5,424,111 A | 6/1995 | Farbstein | |
| 5,439,716 A | 8/1995 | Larsen | |
| 5,460,862 A | 10/1995 | Roller | |
| 5,512,341 A | 4/1996 | Newby et al. | |
| 5,655,282 A | 8/1997 | Hodek et al. | |
| 5,679,419 A | 10/1997 | Larsen | |
| 5,759,665 A | 6/1998 | Lafond | |
| 5,773,135 A | 6/1998 | Lafond | |
| 5,851,627 A | 12/1998 | Farbstein | |
| 5,962,090 A | 10/1999 | Trautz | |
| 6,002,521 A * | 12/1999 | Town | E06B 3/6604 359/1 |
| 6,060,178 A | 5/2000 | Krisko | |
| 6,061,994 A | 5/2000 | Goer et al. | |
| 6,115,989 A | 9/2000 | Boone et al. | |
| 6,223,414 B1 | 5/2001 | Hodek et al. | |
| 6,250,045 B1 | 6/2001 | Goer et al. | |
| 6,250,245 B1 | 6/2001 | Robinson et al. | |
| 6,266,940 B1 | 7/2001 | Reichert | |
| 6,339,909 B1 | 1/2002 | Brunnhofer et al. | |
| 6,351,923 B1 | 3/2002 | Peterson | |
| 6,389,779 B1 | 5/2002 | Brunnhofer | |
| 6,391,400 B1 | 5/2002 | Russell et al. | |
| 6,457,294 B1 | 10/2002 | Virnelson et al. | |
| 6,503,617 B2 | 1/2003 | Jacobsen et al. | |
| 6,528,131 B1 | 3/2003 | Lafond | |
| 6,537,629 B1 | 3/2003 | Ensinger | |
| 6,613,404 B2 | 9/2003 | Johnson | |
| 6,796,102 B2 | 9/2004 | Virnelson et al. | |
| 6,989,188 B2 | 1/2006 | Brunnhofer et al. | |
| 7,317,280 B2 | 1/2008 | Qiu et al. | |
| 7,827,760 B2 | 11/2010 | Brunnhofer et al. | |
| 7,997,037 B2 | 8/2011 | Crandell et al. | |
| 8,453,415 B2 | 6/2013 | Brunnhofer et al. | |
| 8,484,912 B2 | 7/2013 | Engelmeyer | |
| 9,260,906 B2 | 2/2016 | Schreiber | |
| 2001/0001357 A1 | 5/2001 | Reichert | |
| 2002/0192473 A1 | 12/2002 | Gentilhomme et al. | |
| 2003/0074859 A1 | 4/2003 | Reichert et al. | |
| 2004/0028953 A1 | 2/2004 | Kraemling | |
| 2004/0076815 A1 | 4/2004 | Reichert | |
| 2004/0163347 A1 | 8/2004 | Hodek et al. | |
| 2005/0034386 A1 | 2/2005 | Crandell et al. | |
| 2005/0170161 A1 | 8/2005 | Ramchandra et al. | |
| 2005/0214487 A1 | 9/2005 | Trautz | |
| 2005/0287370 A1 | 12/2005 | Kaczmarek et al. | |
| 2006/0003138 A1 | 1/2006 | Kaczmarek et al. | |
| 2006/0130427 A1 | 6/2006 | Hodek et al. | |
| 2006/0150577 A1 | 7/2006 | Hodek et al. | |
| 2006/0162281 A1 | 7/2006 | Pettit et al. | |
| 2006/0260227 A1 | 11/2006 | Winfield | |
| 2007/0087140 A1 | 4/2007 | Dierks | |
| 2007/0122572 A1 | 5/2007 | Shibuya et al. | |
| 2007/0251180 A1 | 11/2007 | Gosling et al. | |
| 2007/0261358 A1 | 11/2007 | Davis et al. | |
| 2007/0261795 A1 | 11/2007 | Rosskamp et al. | |
| 2008/0053037 A1 | 3/2008 | Gallagher | |
| 2008/0134596 A1 | 6/2008 | Brunnhofer et al. | |
| 2009/0120019 A1 | 5/2009 | Trpkovski | |
| 2009/0120035 A1 | 5/2009 | Trpkovski | |
| 2009/0139165 A1 | 6/2009 | Prete et al. | |
| 2009/0186213 A1 | 7/2009 | Ihlo et al. | |
| 2009/0197077 A1 | 8/2009 | Reutler et al. | |
| 2009/0243802 A1 * | 10/2009 | Wolf | E06B 3/66309 340/10.1 |
| 2009/0301637 A1 | 12/2009 | Reichert | |
| 2010/0011703 A1 | 1/2010 | Seele et al. | |
| 2010/0107529 A1 | 5/2010 | Engelmeyer | |
| 2011/0041427 A1 * | 2/2011 | Bouesnard | E06B 3/66309 52/171.3 |
| 2011/0275796 A1 | 11/2011 | Seilz et al. | |
| 2012/0141699 A1 | 6/2012 | Mader | |
| 2012/0297707 A1 | 11/2012 | Lenz et al. | |
| 2012/0297708 A1 | 11/2012 | Brunnhofer et al. | |
| 2013/0079446 A1 | 3/2013 | Becker et al. | |
| 2014/0272207 A1 | 9/2014 | McKenna et al. | |
| 2014/0356557 A1 | 12/2014 | Reichert | |
| 2015/0107167 A1 | 4/2015 | Baumann et al. | |
| 2016/0069123 A1 | 3/2016 | Schreiber | |
| 2016/0201381 A1 | 7/2016 | Kuster et al. | |
| 2016/0290032 A1 | 10/2016 | Kuster et al. | |
| 2017/0145734 A1 | 5/2017 | Kuster et al. | |
| 2017/0152701 A1 | 6/2017 | Kuster et al. | |
| 2018/0058139 A1 | 3/2018 | Schwerdt et al. | |

FOREIGN PATENT DOCUMENTS

| | | |
|---|---|---|
| CN | 1678810 A | 10/2005 |
| DE | 2555384 C3 | 3/1982 |
| DE | 3302659 A1 | 8/1984 |
| DE | 2752542 C2 | 10/1989 |
| DE | 9408764 U1 | 10/1995 |
| DE | 4024697 | 2/1996 |
| DE | 19533685 A1 | 3/1997 |
| DE | 19602455 A1 | 7/1997 |
| DE | 19625845 A1 | 1/1998 |
| DE | 198 05 348 A1 | 8/1999 |
| DE | 198 07 454 A1 | 8/1999 |
| DE | 69607473 T2 | 9/2000 |
| DE | 19927683 C1 | 1/2001 |
| DE | 10025321 A1 | 1/2002 |
| DE | 10356216 A1 | 7/2005 |
| DE | 69633132 T2 | 8/2005 |
| DE | 102009006062 A1 | 7/2010 |
| DE | 102009057156 A1 | 6/2011 |
| DE | 102010006127 A1 | 8/2011 |
| DE | 20 2012 104026 U1 | 10/2013 |
| EP | 0078530 A2 | 5/1983 |
| EP | 0154428 A2 | 9/1985 |
| EP | 0261923 A2 | 3/1988 |
| EP | 0430889 A2 | 6/1991 |
| EP | 0852280 | 7/1998 |
| EP | 0865560 B1 | 8/2004 |
| EP | 1607216 A1 | 12/2005 |
| EP | 1607217 A1 | 12/2005 |
| EP | 0912455 B1 | 5/2006 |
| EP | 1892365 A1 | 2/2008 |
| EP | 1218307 B1 | 7/2008 |
| EP | 1917222 B1 | 3/2009 |
| EP | 2218862 A2 | 8/2010 |
| EP | 2270307 A2 | 1/2011 |
| EP | 2363565 A2 | 9/2011 |
| EP | 2420536 A1 | 2/2012 |
| EP | 2584135 A2 | 4/2013 |
| EP | 2628884 A2 | 8/2013 |
| EP | 2802726 B1 | 4/2016 |
| FR | 2205620 A1 | 5/1974 |
| FR | 2799005 A1 | 3/2001 |
| GB | 1203999 A | 3/1983 |

(56) References Cited

FOREIGN PATENT DOCUMENTS

| | | |
|---|---|---|
| GB | 2210899 A | 6/1989 |
| JP | H09175843 A | 7/1997 |
| JP | H11189439 A | 7/1999 |
| JP | 2008-019131 A | 1/2008 |
| WO | 97/48649 A1 | 12/1997 |
| WO | 98/25813 A1 | 7/1998 |
| WO | 01/16046 A1 | 3/2001 |
| WO | 2004/005783 A2 | 1/2004 |
| WO | 2007/042688 A1 | 4/2007 |
| WO | 2007/101964 A1 | 9/2007 |
| WO | 2008/022877 A1 | 2/2008 |
| WO | 2010034781 A2 | 4/2010 |
| WO | 2010/115456 A1 | 10/2010 |
| WO | 2011088994 A2 | 7/2011 |
| WO | 2012/095266 A1 | 7/2012 |
| WO | 2012/140005 A1 | 10/2012 |
| WO | 2013/104507 | 7/2013 |
| WO | 2014/198429 A1 | 12/2014 |
| WO | 2014/198431 A1 | 12/2014 |

OTHER PUBLICATIONS

Non-Final Office Action for U.S. Appl. No. 14/942,092, filed Nov. 16, 2015 on behalf of Walter Schreiber, dated Apr. 4, 2017. 22 pages.
Final Office Action for U.S. Appl. No. 14/942,092, filed Nov. 16, 2015 on behalf of Walter Schreiber, dated Sep. 12, 2017. 19 pages.
Non-Final Office Action for U.S. Appl. No. 14/942,092, filed Nov. 16, 2015 on behalf of Walter Schreiber, dated Jan. 3, 2018. 19 pages.
Non-Final Office Action for U.S. Appl. No. 14/909,073, filed Jan. 29, 2016 on behalf of Hans-Werner Kuster, dated Apr. 4, 2017. 14 pages.
Final Office Action for U.S. Appl. No. 14/909,073, filed Jan. 29, 2016 on behalf of Hans-Werner Kuster, dated Jun. 20, 2017. 23 pages.
Non-Final Office Action for U.S. Appl. No. 14/909,073, filed Jan. 29, 2016 on behalf of Hans-Werner Kuster, dated Aug. 25, 2017. 20 pages.
Written Opinion for International Patent Application No. PCT/EP2014/076736 filed Dec. 5, 2014 on behalf of Saint-Gobain Glass France, dated Mar. 10, 2016. (English Translation + German Original). 10 pages.
Non-Final Office Action for U.S. Appl. No. 15/038,298, filed May 20, 2016 on behalf of Hans-Werner Kuster, dated Dec. 28, 2017. 8 pages.
Written Opinion for International Patent Application No. PCT/EP2014/076739 filed Dec. 5, 2014 on behalf of Saint-Gobain Glass France, dated Feb. 3, 2015. (English Translation + German Original). 14 pages.
International Search Report for International Patent Application No. PCT/EP2015/063814 filed Jun. 19, 2015 on behalf of Saint-Gobain Glass France, dated Aug. 14, 2015. (English Translation + German Original). 5 pages.
Written Opinion for International Patent Application No. PCT/EP2015/063814 filed Jun. 19, 2015 on behalf of Saint-Gobain Glass France, dated Aug. 14, 2015. (English Translation + German Original). 16 pages.
International Search Report for International Patent Application No. PCT/EP2015/063821 filed Jun. 19, 2015 on behalf of Saint-Gobain Glass France, dated Aug. 19, 2015. (English Translation + German Original). 5 pages.
Written Opinion Report for International Patent Application No. PCT/EP2015/063821 filed Jun. 19, 2015 on behalf of Saint-Gobain Glass France, dated Aug. 19, 2015. (English Translation + German Original). 16 pages.
International Search Report for International Patent Application No. PCT/EP2016/054226 filed Feb. 29, 2016 on behalf of Saint-Gobain Glass France, dated May 3, 2016. (English Translation + German Original). 5 pages.

Written Opinion for International Patent Application No. PCT/EP2016/054226 filed Feb. 29, 2016 on behalf of Saint-Gobain Glass France, dated May 3, 2016. (English Translation + German Original). 9 pages.
International Search Report for International Application No. PCT/EP2014/076736 filed on Dec. 5, 2014 in the name of Saint-Gobain Glass France. (English translation and German original) dated Mar. 10, 2016.
Amcor "Ceramis Coating Technology" Oct. 2012, available at http://www.amcor.com/CMSPages/GetFile.aspx?guid=dbab33c8-3471-4e86-aa69-57dc76b525c1. 12 pages.
Final Office Action for U.S. Appl. No. 14/357,164, filed May 8, 2014 on behalf of Walter Schreiber, dated Feb. 9, 2015. 16 pages.
Non-Final Office Action for U.S. Appl. No. 14/357,164, filed May 8, 2014 on behalf of Walter Schreiber, dated Aug. 10, 2015. 14 pages.
Non-Final Office Action for U.S. Appl. No. 14/357,164, filed May 8, 2014 on behalf of Walter Schreiber, dated Sep. 10, 2014. 24 pages.
Notice of Allowance for U.S. Appl. No. 14/357,164, filed May 8, 2014 on behalf of Walter Schreiber, dated Jun. 22, 2015. 8 pages.
Notice of Allowance for U.S. Appl. No. 14/357,164, filed May 8, 2014 on behalf of Walter Schreiber, dated May 18, 2015. 12 pages.
Notice of Allowance for U.S. Appl. No. 14/357,164, filed May 8, 2014 on behalf of Walter Schreiber, dated Nov. 23, 2015. 14 pages.
Notice of Allowance for U.S. Appl. No. 14/357,164, filed May 8, 2014 on behalf of Walter Schreiber, dated Sep. 28, 2015. 12 pages.
Non-Final Office Action for U.S. Appl. No. 14/942,902, filed Nov. 16, 2015 on behalf of Walter Schreiber, dated Mar. 10, 2016. 28 pages.
Written Opinion for International Application No. PCT/EP2012/076341 filed Dec. 20, 2012 on behalf of Saint-Gobain Glass France, dated Feb. 8, 2013. (German original + English Translation) 15 pages.
International Search Report for International Application No. PCT/EP2012/076341 filed Dec. 20, 2012 on behalf of Saint-Gobain Glass France, dated Feb. 8, 2013. (German original + English Translation) 6 pages.
International Preliminary Report on Patentability for International Application No. PCT/EP2012/076341 filed Dec. 20, 2012 on behalf of Saint-Gobain Glass France, dated Jul. 15, 2014. (German original + English Translation) 17 pages.
Written Opinion for International Application No. PCT/EP2014/053714 filed Feb. 26, 2014 on behalf of Saint-Gobain Glass France, dated Mar. 25, 2014. (German original + English Translation) 10 pages.
International Search Report for International Application No. PCT/EP2014/053714 filed Feb. 26, 2014 on behalf of Saint-Gobain Glass France, dated Mar. 25, 2014. (German original + English Translation) 7 pages.
Written Opinion for International Application No. PCT/EP2014/054710 filed Mar. 11, 2014 on behalf of Saint-Gobain Glass France, dated Apr. 4, 2014. (German original + English Translation) 12 pages.
International Search Report for International Application No. PCT/EP2014/054710 filed Mar. 11, 2014 on behalf of Saint-Gobain Glass France, dated Apr. 4, 2014. (German original + English Translation) 5 pages.
Written Opinion for International Application No. PCT/EP2014/067901 filed Aug. 22, 2014 on behalf of Saint-Gobain Glass France, dated Oct. 7, 2014. (German original + English Translation) 13 pages.
International Search Report for International Application No. PCT/EP2014/067901 filed Aug. 22, 2014 on behalf of Saint-Gobain Glass France, dated Oct. 7, 2014. (German original + English Translation) 5 pages.
International Search Report for International Application No. PCT/EP2014/076739 filed on Dec. 5, 2014 in the name of Saint-Gobain Glass France, dated Feb. 3, 2015 (English translation & German original).
Opposition by opponent Camvac Limited in European Patent 2,802,726 B1, issued Apr. 27, 2016 to Saint-Gobain Glass France. Mail date: Jan. 27, 2017. 16 pages.

(56) References Cited

OTHER PUBLICATIONS

Annex A to opposition by opponent Camvac Limited. "Press notes and articles from 2011". May-Aug. 2011. 4 pages.
Annex B to opposition by opponent Camvac Limited. "Invoices and delivery notes from Thermoseal Group Ltd from Aug. 2011 to Dec. 2011". Aug.-Dec. 2011. 24 pages.
Annex BB to opposition by opponent Camvac Limited. "Invoice and delivery note from Thermoseal Group Ltd of Aug. 2011". Aug. 2011. 2 pages.
Annex C1 to opposition by opponent Camvac Limited. "Thermobar production sheets from Thermoseal Group Ltd of Dec. 22, 2011 and Dec. 23, 2011". Dec. 22 and 23, 2011. 2 pages.
Annex C2 to opposition by opponent Camvac Limited. "Stock Control from Thermoseal Group Ltd from Jun. 8, 2011 to Dec. 22, 2011". Jun. 8, 2011-Dec. 22, 2011. 14 pages.
Annex C3 to opposition by opponent Camvac Limited. "Invoices No. 47197, 47486 and 47812 from Lohmann of Jun. 30, 2011, Aug. 26, 2011 and Oct. 31, 2011". Jun. 30, 2011, Aug. 26, 2011, and Oct. 31, 2011. 3 pages.
Annex CC1 to opposition by opponent Camvac Limited. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Camvac Limited. "Stock Control from Thermoseal Group Ltd of Jul. 29, 2011 and Sep. 6, 2011". Jul. 29, 2011 and Sep. 6, 2011. 1 page.
Annex CC3 to opposition by opponent Camvac Limited. "Invoice No. 47340 from Lohmann of Jul. 29, 2011". Jul. 29, 2011. 1 page.
Annex D1 to opposition by opponent Camvac Limited. "Preliminary Data Sheet—Duplocoll 40024". No date. 1 page.
Annex E to opposition by opponent Camvac Limited. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". May 24, 2011, Jun. 8, 2011, Jun. 29, 2011, Jul. 22, 2011, and Aug. 18, 2011. 5 pages.
Annex F1 to opposition by opponent Camvac Limited. "Data Sheet 12/12 Cambrite film from Camvac". No date. 2 pages.
Annex F1A to opposition by opponent Camvac Limited. "Screen shot of Data Sheet 12/12 Cambrite film from Camvac". Jan. 19, 2017. 1 page.
Annex F1B to opposition by opponent Camvac Limited. "Declaration of Mr Gary Chalkley (Camvac Product Development Director)". Jan. 24, 2017. 1 page.
Annex F2 to opposition by opponent Camvac Limited. "Declaration of Mr. James Shipman (Camvac Process Development Manager)". Jan. 24, 2017. 2 pages.
Annex G to opposition by opponent Camvac Limited. "Data sheet PSI values for windows having a Thermobar Warm Edge Spacer". Nov. 2014. 1 page.
Opposition by opponent Ensinger GmbH in European Patent 2,802,726 B1, issued Apr. 27, 2016 to Saint-Gobain Glass France. Mail date: Jan. 27, 2017. 44 pages. (English Translation + German Original).
Annex D1A to opposition by opponent Ensinger GmbH. "Affidavit of Mr. Marc Rehling". Jan. 24, 2017. 4 pages. (English Translation + German Original).
Annex D1B to opposition by opponent Ensinger GmbH. "Photography of "Thermobar" Spacer". No date. 1 page.
Annex D1C to opposition by opponent Ensinger GmbH "Test Report AP Nov. 16, 1998". Nov. 2016. 8 pages. (German Original Only).
Annex D1D to opposition by opponent Ensinger GmbH. "Figure 5 of D1C with annotations". 13 pages. No date. (English Translation + German Original).
Annex D1E to opposition by opponent Ensinger GmbH. "ATR-Infrared Spectroscopy Measurement of the "Thermobar" Spacer". Dec. 12, 2016. 2 pages. (English Translation + German Original).
Annex D1F to opposition by opponent Ensinger GmbH. "Expert Opinion on "Thermobar" Spacer". Jan. 18, 2017. 14 pages. (English Translation + German Original).
Annex D2 to opposition by opponent Ensinger GmbH. "DIN EN ISO 10077-1 in the version dated May 2010". May 2010. 48 pages. (English Translation + German Original).
Annex D7 to opposition by opponent Ensinger GmbH. "Avis Technique [Technical Evaluation] 6/04-1562 regarding the Super Spacer Premium and the Super Spacer Premium Plus the Edgetech Europe GmbH". Jan. 4, 2005. 46 pages. (English Translation + German Original).
Opposition by opponent Helima GmbH in European Patent 2,802,726 B1, issued Apr. 27, 2016 to Saint-Gobain Glass France. Mail date: Jan. 27, 2017. 159 pages. (English Translation + German Original).
Supplement to opposition by opponent Helima GmbH in European Patent 2,802,726 B1, issued Apr. 27, 2016 to Saint-Gobain Glass France. Mail date: Mar. 23, 2017. 6 pages. (English Translation + German Original).
Annex A1 to opposition by opponent Helima GmbH. "Excerpt from the website of the company Viking regarding Window DK88". Sep. 2012. 4 pages.
Annex A2 to opposition by opponent Helima GmbH. "Excerpt from the Polish website of the patent holder". Nov. 12, 2012. 3 pages. (English Translation + German Original).
Annex A3 to opposition by opponent Helima GmbH. "Technical Opinion 6/13-2124*01 Add of the CSTB". Sep. 24, 2014. 60 pages. (English Translation + French Original).
Annex A4 to opposition by opponent Helima GmbH. "Technical Opinion 6/16-2303 of the CSTB". Jun. 30, 2016. 62 pages. (English Translation + French Original).
Annex A5 to opposition by opponent Helima GmbH. "Datasheet Swisspacer Ultimate". Apr. 2013. 2 pages. (English Translation + German Original).
Annex A6 to opposition by opponent Helima GmbH. "Excerpt from AIMCAL "Metallizing Technical Reference"". May 2012. 2 pages.
Annex A7 to opposition by opponent Helima GmbH. "Excerpt from Frick/Knöll: Baukonstruktionslehre [Structural Design Theory] 2, Ed.34". Hestermann and Rongen, "Frick/Knoll Baukonstruktionslehre 2", pp. 371-372, 2013. 4 pages. (German Original Only).
Annex A8 to opposition by opponent Helima GmbH. "Affidavit". Jan. 27, 2017. 2 pages.
Annex A9 to opposition by opponent Helima GmbH. "Datasheet Sanco ACS Thermix". Jun. 2009. 5 pages. (English Translation + German Original).
Annex A10 to opposition by opponent Helima GmbH. "Barrier films for vacuum insulation panels (VIP)". Kaczmarek, "Barrier films for vacuum insulation panels (VIP)", 7th International Vacuum Insulation Symposium 2005, pp. 91-98, 2005. 8 pages.
Opposition by opponent Rolltech A/S in European Patent 2,802,726 B1, issued Apr. 27, 2016 to Saint-Gobain Glass France. Mail date: Jan. 27, 2017. 32 pages.
Annex O1i to opposition by opponent Rolltech A/S. "Ceramis Barrier Films by Alcan Packaging". Mar. 2005. 4 pages.
Annex O1ii to opposition by opponent Rolltech A/S. "'Barrier Films: SiOx Barrier Benefits' by Marius Breune in Paper, Film & Foil Converter". Oct. 1, 2010. 4 pages.
Opposition by opponent Technoform Glass Insulation Holding GmbH in European Patent 2,802,726 B1, issued Apr. 27, 2016 to Saint-Gobain Glass France. Mail Date: Jan. 26, 2017. 55 pages. (English Translation + German Original).
Annex E6a to opposition by opponent Technoform Glass Insulation Holding GmbH. "ISO 10077-1 in the version of 2006". Sep. 15, 2006. 42 pages.
Annex E6b to opposition by opponent Technoform Glass Insulation Holding GmbH. "ISO 10077-2 in the version of 2012". Mar. 1, 2012. 44 pages.
Annex E6c to opposition by opponent Technoform Glass Insulation Holding GmbH. "two data sheets Saint-Gobain Swisspacer from 2008". Oct. 2008. 2 pages.
Opposition by opponent Thermoseal Group Ltd in European Patent 2,802,726 B1, issued Apr. 27, 2016 to Saint-Gobain Glass France. Mail date: Jan. 27, 2017. 20 pages.
Annex A to opposition by opponent Thermoseal Group Ltd. "Press notes and articles from 2011". May-Sep. 2011. 4 pages.

(56) References Cited

OTHER PUBLICATIONS

Annex B to opposition by opponent Thermoseal Group Ltd. "Invoices and delivery notes from Thermoseal Group Ltd from Aug. 2011 to Dec. 2011". Aug. Dec. 2011. 24 pages.
Annex BB to opposition by opponent Thermoseal Group Ltd. "Invoice and delivery note from Thermoseal Group Ltd of Aug. 2011". Aug. 2011. 2 pages.
Annex C1 to opposition by opponent Thermoseal Group Ltd. "Thermobar production sheets from Thermoseal Group Ltd of Dec. 22, 2011 and Dec. 23, 2011". Dec. 22 and 23, 2011. 2 pages.
Annex C2 to opposition by opponent Thermoseal Group Ltd. "Stock Control from Thermoseal Group Ltd from Jun. 8, 2011 to Dec. 22, 2011". Jun. 8, 2011-Dec. 22, 2011. 14 pages.
Annex C3 to opposition by opponent Thermoseal Group Ltd. "Invoices No. 47197, 47486 and 47812 from Lohmann of Jun. 30, 2011, Aug. 26, 2011 and Oct. 31, 2011". Jun. 30, 2011, Aug. 26, 2011, Oct. 31, 2011. 3 pages.
Annex CC1 to opposition by opponent Thermoseal Group Ltd. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Thermoseal Group Ltd. "Stock Control from Thermoseal Group Ltd of Jul. 29, 2011 and Sep. 6, 2011". Jul. 29, 2011 and Sep. 6, 2011. 1 page.
Annex CC3 to opposition by opponent Thermoseal Group Ltd. "Invoice No. 47340 from Lohmann of Jul. 29, 2011". Jul. 29, 2011. 1 page.
Annex D1 to opposition by opponent Thermoseal Group Ltd. "Preliminary Data Sheet—Duplocoll 40024". No date. 1 page.
Annex D2 to opposition by opponent Thermoseal Group Ltd. "Declaration of Ms Amanda Smith (Lohmann Segment Manager)". Jan. 18, 2014. 1 page.
Annex E to opposition by opponent Thermoseal Group Ltd. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". Jul. 22, 2011 and Aug. 18, 2011. 6 pages.
Annex F1 to opposition by opponent Thermoseal Group Ltd. "Data Sheet of 12/12 Cambrite film from Camvac". No date. 2 pages.
Annex F1A to opposition by opponent Thermoseal Group Ltd. "Screen shot showing the last date that the 12/12 Cambrite film from Camvac data sheet was modified". Jan. 19, 2017. 1 page.
Annex F2 to opposition by opponent Thermoseal Group Ltd. "Declaration of Mr James Shipman (Camvac Process Development Manager)". Jan. 24, 2017. 2 pages.
Annex G to opposition by opponent Thermoseal Group Ltd. "Data sheet PSI values for windows having a Thermobar Warm Edge Spacer". Nov. 2014. 1 page.
Annex D1C to opposition by opponent Ensinger GmbH (Jan. 27, 2017) in European Patent 2,802,726 B1 (issued to Saint-Gobain Glass France). "Test Report, Light micrographs of two existing polished sections with the designation 2010 and 2011", Institute of Polymertechnology, Nov. 2016, 16 pages. (English Translation + German Original).
Annex A7 to opposition by opponent Helima GmbH (Jan. 27, 2017) in European Patent 2,802,726 B1 (issued to Saint-Gobain Glass France). Hestermann and Rongen, "Frick/Knöll Baukonstruktionslehre 2", pp. 371-372, 1996-2013, 10 pages. (English Translation + German Original).
Response to notices of opposition against European Patent EP 2 802 726 B1 by the companies Technoform Glass Insulation Holding GmbH (O1), Ensinger GmbH (O2), Camvac Limited (O3), Thermoseal Group Limited (O4), Rolltech A/S (O5), Helima GmbH (O6). Mail Date: Aug. 22, 2017. 119 pages. (English Translation + German Original).
M.W. Phaneuf, "Applications of focused ion beam microscopy to materials science specimens", Micron 30. Jan. 28, 1999. pp. 277-288.
Bishop et al., "Metallizing Technical Reference", AIMCAL, May 2012. Title and pp. 21-25. 6 pages.
Opposition by opponent Helima Gmbh in European Patent 2,802,726 B1, issued Aug. 22, 2017 to Saint-Gobain Glass France. Mail date: Nov. 24, 2017. 14 pages. (German Original + English translation).
Zimmermann, M.—7th International Vacuum Insulation Symposium 2005, Table of Contents, pp. 1 to 4, Switzerland, Sep. 2005, 4 pages.
Delstar Technologies online catalog, Delstar catalogs Delnet as a "Nets/Mesh/Apertured Film" Downloaded from the internet on Feb. 14, 2017. 1 page. (http://extrudedfilmsandnets.co.uk/products/product-types/nets-mesh-apertured-film).
Delstar Technologies online catalog, Delstar catalogs Delnet as a "Search/Category-all/Net" Downloaded from the internet on Feb. 14, 2017. 1 page. (http://extrudedfilmsandnets.co.uk/products/finder/search/catgory-all/net).
Non-Final Office Action for U.S. Appl. No. 15/321,161, filed Dec. 21, 2016 on behalf of Saint-Gobain Glass France, dated Mar. 20, 2018. 13 pages.
Non-Final Office Action for U.S. Appl. No. 15/321,170, filed Dec. 21, 2016 on behalf of Saint-Gobain Glass France, dated Mar. 22, 2018. 9 pages.
Non-Final Office Action for U.S. Appl. No. 14/942,902, filed Nov. 16, 2015 on behalf of Saint-Gobain Glass France, dated Apr. 2, 2018. 19 pages.
Notice of Allowance for U.S. Appl. No. 15/038,298, filed May 20, 2016 on behalf of Saint-Gobain Glass France, dated May 31, 2018. 8 pages.
Reply by opponent Rolltech A/S in European Patent 2,802,726 B1, issued Apr. 27, 2016 to Saint-Gobain Glass France. Mail Date: Feb. 1, 2018. 8 pages.
Exhibit S27c to reply by opponent Rolltech A/S in European Patent 2,802,726 Bl, issued Apr. 27, 2016 to Saint-Gobain Glass France. Sep. 12, 2017. 2 pages.
Exhibit S27d to reply by opponent Rolltech A/S in European Patent 2,802,726 B1, issued Apr. 27, 2016 to Saint-Gobain Glass France. Oct. 2010. 6 pages.
Reply by opponent Technoform Glass Insulation Holding GmbH in European Patent 2,802,726 B1, issued Apr. 27, 2016 to Saint-Gobain Glass France. Mail Date: Apr. 20, 2018. 15 pages. (English Translation + German Original).
Response by patentee Saint-Gobain Glass France to opponent's reply papers in European Patent 2,802,726 B1, issued Apr. 27, 2016 to Saint-Gobain Glass France. Mail Date: Jun. 18, 2018. 32 pages. (English Translation + German Original).

\* cited by examiner

DOUBLE GLAZING HAVING IMPROVED SEALING

CROSS REFERENCE TO RELATED APPLICATIONS

The present application is the U.S. national stage entry of International Patent Application No. PCT/EP2014/076736, filed internationally on Dec. 5, 2014, which, in turn, claims priority to European Patent Application No. 13196866.1, filed on Dec. 12, 2013.

The invention relates to an insulating glazing unit having improved sealing, a method for its production, and its use.

The thermal conductivity of glass is lower by roughly a factor of 2 to 3 than that of concrete or similar building materials. However, since, in most cases, panes are designed significantly thinner than comparable elements made of brick or concrete, buildings frequently lose the greatest share of heat via external glazing. This effect is particularly significant in high-rise buildings with partial or complete glass façades. The increased costs necessary for heating and air-conditioning systems make up a part of the maintenance costs of the building that must not be underestimated. Moreover, as a consequence of more stringent construction regulations, lower carbon dioxide emissions are required. An important approach to a solution for this involves insulating glazing units, without which, primarily as a result of increasingly rapidly rising prices of raw materials and more stringent environmental protection constraints, it is no longer possible to imagine the building construction sector.

Insulating glazing units are manufactured from at least two panes that are connected to each other via at least one circumferential spacer. Depending on the embodiment, the interpane space between the two panes, referred to as the "glazing interior", is filled with air or gas, but in any case free of moisture. An excessive moisture content in the interpane space of the glazing results, in particular in the case of cold exterior temperatures, in the condensation of drops of water in the interpane space, which absolutely must be avoided. To absorb the residual moisture remaining in the system after assembly, hollow body spacers filled with a desiccant can, for example, be used. However, since the absorption capacity of the desiccant is limited, even in this case the sealing of the system is of enormous importance to prevent the penetration of additional moisture. In the case of gas-filled insulating glazing units, into whose glazing interior an argon filling, for example, is introduced, gas tightness must also be ensured.

In order to ensure improved leak tightness of insulating glazing units, greatly varied modifications in the field of the spacers are already known. Already in DE 40 24 697 A1, the problem is discussed that customary single or double sealed insulating glass edge bonds made of materials such as polysulfide polymers, butyl hot melt, silicone rubber, polymercaptan, or polyurethane cannot ensure long-term adequate sealing and, over time, an undesirable gas exchange between the glazing interior and the environment occurs. Improved sealing is accomplished according to DE 40 24 697 A1 by means of a modification of the spacer, onto whose pane contact surfaces polyvinylidene chloride films or coatings are applied.

Another measure for improving the leak tightness of insulating glazing units is the coating of polymeric spacers with metal foils or alternating metal polymer layer systems, as disclosed, for example, in EP 0 852 280 A1 and WO 2013/104507 A1. These ensure high leak tightness of the spacer with simultaneous compatibility with the sealing materials used for assembly.

Despite these improvements in the field of spacers, independent of their leak tightness, the seal between the spacer and the panes and the seal of the external interpane space persist as potential vulnerabilities.

The object of the present invention is to provide an insulating glazing unit which has improved sealing of the external interpane space as well as an economical method for production thereof.

The object of the present invention is accomplished according to the invention by an insulating glazing unit, a method for production thereof, and use thereof according to the disclosure. Preferred embodiments of the invention also emerge from the disclosure.

The insulating glazing unit according to the invention comprises at least a first pane and a second pane and a spacer between the first pane and the second pane. The spacer comprises a glazing interior surface, an external surface, and two pane contact surfaces, wherein the glazing interior surface is adjacent the glazing interior of the insulating glazing unit and the external surface is adjacent the external interpane space. The pane contact surfaces are preferably parallel to each other. The glazing interior enclosed by the circumferential spacer and the panes should be hermetically sealed against gas exchange and penetration of moisture. To that end, a primary sealant which serves, on the one hand, for bonding of the spacer and, on the other, seals the gap between the spacer and the pane is applied between the pane contact surfaces of the spacer and the panes. A secondary sealant, which fills the interpane space in its entire width between the first pane and the second pane, is introduced in the external interpane space adjacent the outer surface of the spacer. Thus, for one thing, the primary sealant and, for another, the spacer are covered. In the event of a possible failure of the primary sealant or a leak of the spacer, the error-free functioning of the insulating glazing unit is thus still ensured. The primary and the secondary sealant thus serve for redundant sealing. Moreover, a tertiary sealant, which is likewise filled over the entire area between the first pane and second pane, is introduced into the external interpane space adjacent the secondary sealant. This tertiary sealant effects a bonding of the first and the second pane and thus ensures adequate mechanical stability of the insulating glazing unit.

By means of the combination according to the invention of a primary and a secondary sealant, improved sealing, which results in a substantial extension of the service life of the insulating glazing unit, is possible. Dual sealing according to the invention using a primary and a secondary sealant has, in contrast to single sealing, the advantage that multilayer systems are substantially less prone to error than a single layer system of the same thickness. An error in one of the layers of a multilayer does not result in a loss of function. In contrast, with a single layer, even a small defect can result in a complete failure. The tertiary sealant serves less for sealing than for mechanical stability of the glazing unit.

In a preferred embodiment, the secondary sealant and the primary sealant contain butyl rubber, polyisobutylene, polyethylene vinyl alcohol, ethylene vinyl acetate, polyolefin rubber, copolymers, and/or mixtures thereof, with the secondary sealant and the primary sealant also possibly having different compositions. The primary sealant and the secondary sealant are gas- and watertight such that the glazing interior is sealed against the entry of atmospheric moisture as well as the escape of a filling gas.

The tertiary sealant preferably contains polysulfides, silicones, silicone rubber, polyurethanes, polyacrylates, copolymers, and/or mixtures thereof. Such materials have very good adhesion on glass such that the tertiary sealant serves mainly for the bonding of the panes.

A sealing of the external interpane space with only a primary and a tertiary sealant, as is known in the prior art, is, for various reasons, not optimal. The sealants, such as silicone, used for bonding are gas and water permeable. Thus, the sealing is done via only a primary sealant, such as polyisobutylene, such that even a small defect results in a complete failure of the glazing. Moreover, there is no additional sealing of the spacer, as a result of which a leak of the spacer likewise results in a complete loss of function. In contrast, the insulating glazing unit according to the invention has a combination of three sealants, with the primary and secondary sealant effecting sealing of the glazing interior and the bonding of the panes done via the tertiary sealant. The secondary sealant serves here as redundant security if leaks develop in the primary sealant of the spacer. Compared to the insulating glazing units known in the prior art, this combination of sealants according to the invention thus substantially improves the service life of the glazing.

In a possible embodiment, the outer surface of the spacer has a bored hole, for example, for filling with desiccant. The sealing according to the invention of the external interpane space is particularly advantageous here since even the opening of the bored hole is sealed gas- and watertight by the secondary sealant.

In an alternative embodiment, the bored hole is made on one of the pane contact surfaces of the spacer. In that case, the opening of the bored hole is advantageously sealed redundantly by the primary and the secondary sealant.

In a preferred embodiment, the penetration index of the secondary sealant is less than the penetration index of the primary sealant. All data used here refer to the penetration index per ISO 2137-DIN 5180 measured at a temperature of 60° C. The penetration index is a measure of the hardness of the material. Accordingly, a material with a small penetration index is harder than a material with a large penetration index. The selection of a soft primary sealant is, among other things, advantageous in processing. To that end, a strand of the primary sealant is applied to the pane surfaces and pressed with the pane contact surfaces of the spacer. The primary sealant fills the gap between the panes and the spacer over its entire area. This can be achieved only through the selection of a soft material. Here, a hard material would result in defective sealing. On the contrary, the secondary sealant completely fills the external interpane space between the first pane and the second pane. Here, the selection of a harder material is particularly advantageous in order to obtain a reliable seal even at high temperatures. Soft materials with high penetration indices start to flow in the event of strong heating, as a result of which the individual components of the insulating glazing unit can shift relative to each other and/or a failure of the seal can occur. Through the use of a harder sealant material, this is prevented. Even if the primary sealant starts to flow under strong heating, the spacer remains fixed in its position by the secondary sealant and seals the glazing interior. The combination of a primary sealant with a high penetration index and a secondary sealant with a lower penetration index accordingly enables particularly reliable redundant sealing that withstands even strong heating.

The penetration index of the primary sealant is preferably between 45 and 100, particularly preferably between 50 and 70. The penetration index of the secondary sealant is preferably selected between 20 and 40, particularly preferably between 30 and 40. Within these ranges, particularly good sealing of the glazing interior space can be achieved.

The thickness of the primary sealant is preferably 0.1 mm to 0.5 mm.

The thickness of the secondary sealant is preferably 0.5 mm to 5 mm, particularly preferably 1 mm to 2 mm.

The thickness of the tertiary sealant is preferably 2 mm to 30 mm, particularly preferably 5 mm to 10 mm.

Thus, the thickness of the tertiary sealant is selected substantially greater compared to the thicknesses of the primary and secondary sealants. A thin layer of the primary and secondary sealant already suffices for sealing, whereas the tertiary sealant used for bonding is used in a greater layer thickness in order to obtain the highest possible mechanical stability.

In a possible embodiment, the insulating glazing unit includes more than two panes.

In that case, for example, a third pane, for example, can be fixed in or on the spacer between the first pane and the second pane. In this embodiment, there is still a single external interpane space that is sealed according to the invention.

Alternatively, a plurality of spacers can also be used. In this case, an additional spacer is fixed on the first pane and/or the second pane parallel to the spacer situated between the first and the second pane. According to this embodiment, the insulating glazing unit has a plurality of external interpane spaces that are sealed according to the invention.

All spacers known in the prior art can be used as spacers. By way of example, polymeric and metallic spacers are mentioned here.

Polymeric spacers preferably contain polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), particularly preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof.

Polymeric spacers can optionally also contain additional components, for instance, glass fibers.

Metallic spacers are preferably manufactured from aluminum or stainless steel.

The spacer is preferably formed as a hollow profile, particularly preferably as a hollow profile with a wall thickness from 0.5 mm to 10 mm. Thus, at least one hollow chamber is situated in the interior of the spacer.

The spacer preferably contains a desiccant, preferably silica gels, molecular sieves, $CaCl_2$, $Na_2SO_4$, activated carbon, silicates, bentonites, zeolites, and/or mixtures thereof. The desiccant is preferably incorporated into the spacer. Particularly preferably, the desiccant is situated in a hollow chamber of the spacer.

The spacer preferably has, along the pane contact surfaces, a height of 5 mm to 15 mm, particularly preferably from 5 mm to 10 mm.

The width of the glazing interior surface, which defines the distance between the first pane and the second pane, is 4 mm to 30 mm, preferably 8 mm to 16 mm.

The spacer optionally includes an insulating film on the outer surface. Such insulating films are used, particularly in conjunction with polymeric spacers, in order to obtain improved sealing and insulation of the spacer. The insulating film comprises, for example, one or a plurality of polymeric layers as well as one or a plurality of metallic or ceramic layers. Such insulating films are known, for example, from WO2013/104507.

However, an insulating film on the outer surface is not absolutely essential even with polymeric spacers since the combination according to the invention of secondary and tertiary sealant suffices for adequate sealing of the spacer.

The glazing interior of the insulating glazing unit is preferably filled with a protective gas, preferably with a noble gas, preferably argon or krypton, which reduce the heat transfer value in the insulating glazing interpane space.

In a preferred embodiment, the glazing interior surface has at least one opening. Preferably, a plurality of openings are made in the glazing interior surface. The total number of the openings depends on the size of the insulating glazing unit. The openings connect the hollow chamber of the spacer to the glazing interpane space, as a result of which a gas exchange is possible therebetween. This enables absorption of atmospheric moisture by a desiccant situated in the hollow chambers and thus prevents fogging of the panes. The openings are preferably implemented as slits, particularly preferably as slits with a width of 0.2 mm and a length of 2 mm. The slits ensure optimal air exchange without the desiccant being able to penetrate out of the hollow chambers into the interpane spaces.

At the corners of the insulating glazing unit, the circumferential spacer is preferably linked via corner connectors. Such corner connectors can, for example, be implemented as a molded plastic part with a gasket, in which two spacers provided with a miter cut abut. In principle, extremely varied geometries of the insulating glazing unit are possible, for example, rectangular, trapezoidal, and rounded shapes. To produce round geometries, the spacer can, for example, be bent in the heated state. The corner connectors likewise include, according to the prior art, a gasket which is pressed together at the time of assembly of the individual parts and thus sealed. However, for this, very accurate and precise assembly is necessary since slippage of the gasket results in leakage of the system. The secondary sealant according to the invention also covers the corner connectors of the spacer such that possible leaks are compensated.

The first pane and the second pane have a thickness of 1 mm to 50 mm, preferably 3 mm to 16 mm, particularly preferably 3 mm to 10 mm, with the two panes also possibly having different thicknesses.

The first pane and/or the second pane contain glass and/or polymers, preferably quartz glass, borosilicate glass, soda lime glass, polymethyl methacrylate, and/or mixtures thereof. Additional panes beyond the second pane also include these materials.

The invention further includes a method for producing an insulating glazing unit according to the invention comprising the steps:
 a) installation of the spacer on the first pane and the second pane by means of a primary sealant via, in each case, a pane contact surface,
 b) pressing the arrangement,
 c) filling a secondary sealant into the external interpane space, and
 d) filling a tertiary sealant into the external interpane space.

In step a), the primary sealant is preferably applied as a strand, for example, with a diameter of 1 mm to 2 mm, onto the pane contact surfaces. At the time of the pressing of the pane arrangement, this strand is uniformly distributed in the gap between the pane contact surface and the adjacent pane, which results in the sealing of the gap.

In step c), the secondary sealant is extruded preferably directly into the external interpane space.

In an alternative embodiment of the method according to the invention, step a) and c) are performed simultaneously. The application of the primary sealant on the pane contact surfaces takes place simultaneously with the extrusion of the secondary sealant. Only after that is the pane arrangement pressed.

In step d), the tertiary sealant is likewise extruded preferably into the external interpane space.

Preferably, the glazing interior between the panes is filled with a protective gas before the pressing of the arrangement.

The invention further includes the use of an insulating glazing unit according to the invention as a building interior glazing, building exterior glazing, and/or façade glazing. Use in combination with other elements, for instance, lighting elements, heating elements, antenna elements, or electrically switchable glazings, such as displays or electrochromic glazings, is also possible. In such glazings, a power supply is required in the glazing interior such that an electrical conductor, such as a connection element, protrudes from the outer interpane space into the glazing interior. In a preferred embodiment, the insulating glazing unit has a connection element whose outer end extends out of the tertiary sealant and is electrically contactable there and whose inner end contacts the electrically switchable element in the glazing interior. The connection element penetrates through the tertiary sealant, the secondary sealant, and the primary sealant and runs between the pane contact surface of the spacer and the adjacent pane.

Figure 2A:
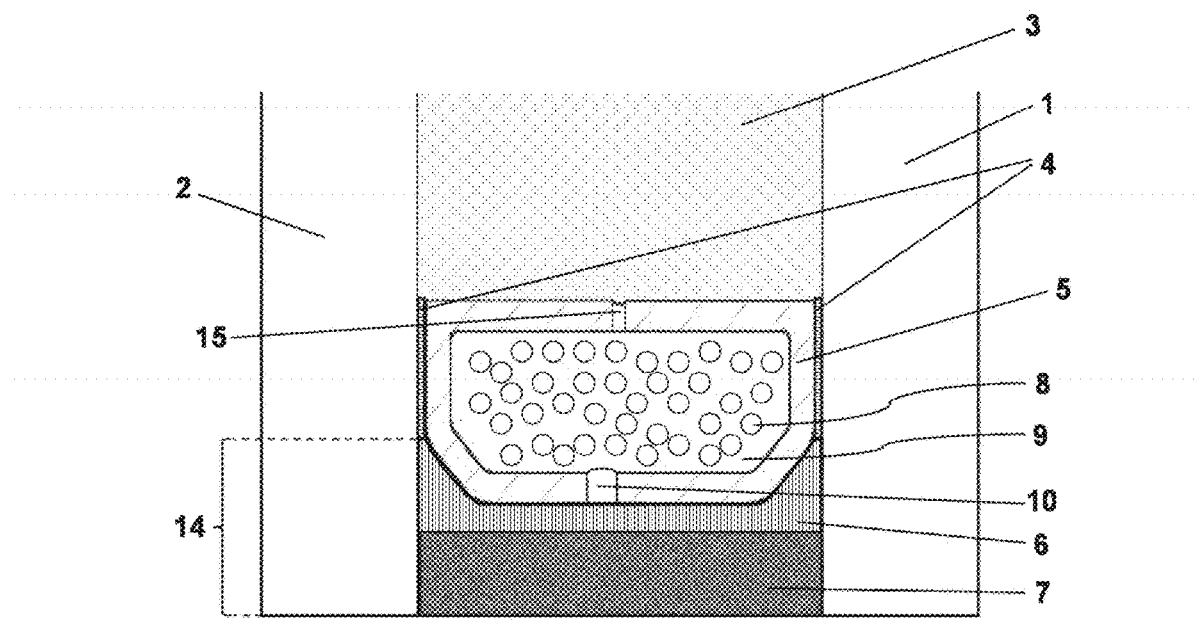
Figure 2B:
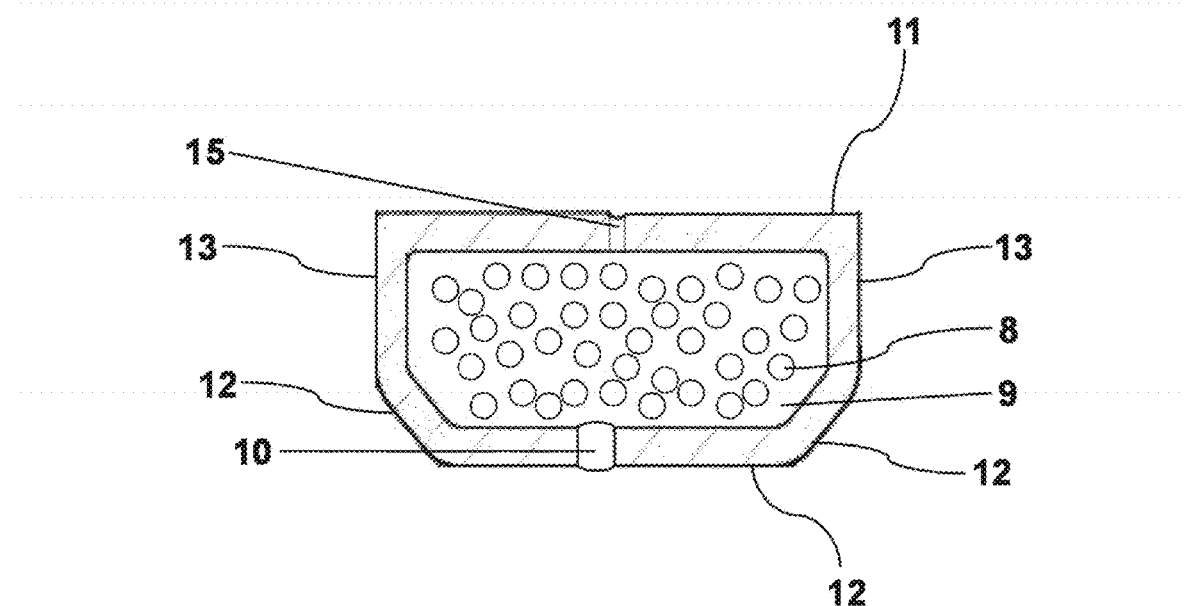
Figure 3:
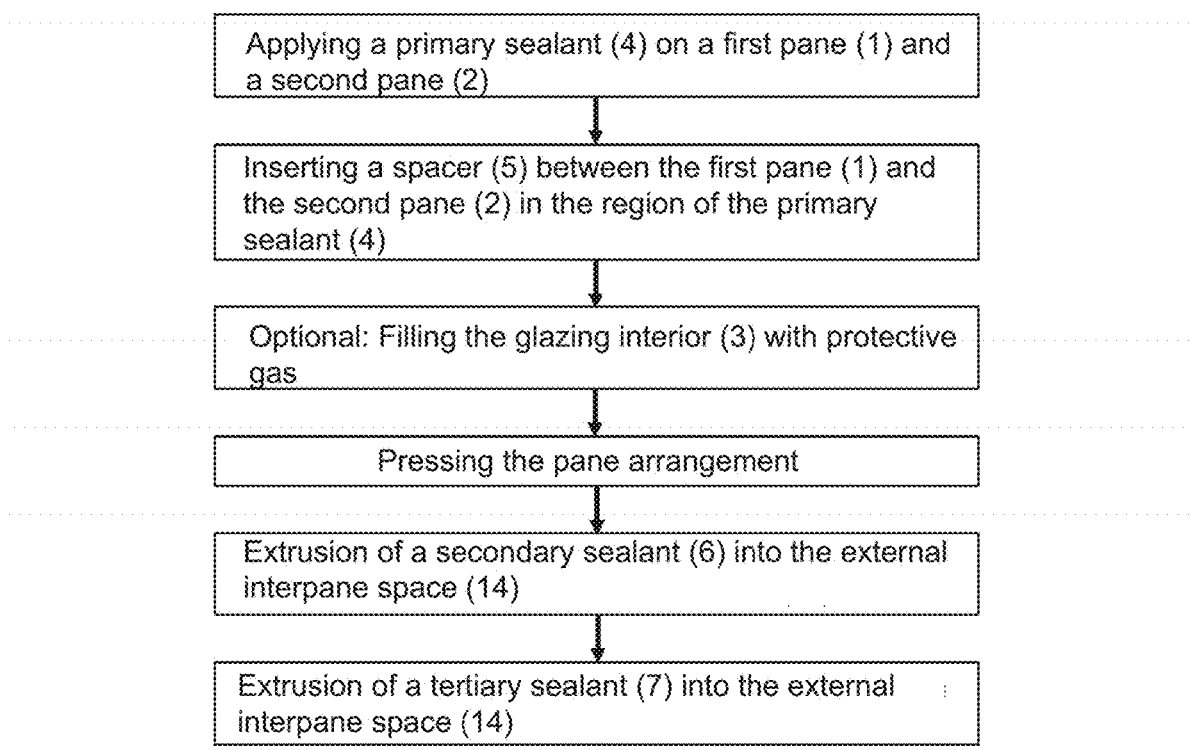

In the following, the invention is explained in detail with reference to drawings. The drawings are purely schematic and not true to scale. They in no way restrict the invention. They depict:

FIG. 1 a schematic representation of the insulating glazing according to the invention, FIGS. 2a and 2b one possible embodiment of the insulating glazing according to the invention, and FIG. 3 a flowchart of one possible embodiment of the method according to the invention.

FIG. 1 depicts a schematic representation of the insulating glazing unit according to the invention in cross-section. A circumferential spacer (5) is fixed between a first pane (1) and a second pane (2) via a primary sealant (4). The primary sealant (4) bonds the pane contact surfaces (13) of the spacer (5) to the panes. The glazing interior (3) adjacent the glazing interior surface (11) of the spacer (5) is defined as the space delimited by the panes (1, 2) and the spacer (5). The external interpane space (14) adjacent the outer surface (12) of the spacer (5) is a strip-shaped circumferential section of the glazing, which is delimited by one side each of the two panes (1, 2) and on another side by the spacer (5) and whose fourth edge is open. A secondary sealant (6) is applied on the outer surface (12) of the spacer (5). This is introduced into the external interpane space only after installation of the spacer and covers the entire area of the intermediate space between the two panes. Any leaks of the primary sealant (4) or of the spacer (5) as well as leaks in the installation of the individual components are compensated thereby. Furthermore, a tertiary sealant (7), which serves to bond the first pane (1) and the second pane (2) and thus contributes decisively to the mechanical stability of the system, is applied on the secondary sealant (6).

FIGS. 2a and 2b depict one possible embodiment of the insulating glazing unit according to the invention. The structure corresponds in its fundamental features to that depicted in FIG. 1. A spacer (5) is fixed between a first pane (1) and a second pane (2). The spacer (5) is a hollow body profile comprising two pane contact surfaces (13), a glazing interior surface (11), an external surface (12), and a hollow chamber (9). The spacer (5) contains styrene acrylonitrile (SAN) and roughly 35 wt.-% glass fibers. The outer surface (12) has an angled shape wherein the sections adjacent the pane contact surfaces (13) of the outer surface are inclined at an angle of 30° relative to the pane contact surfaces (13). This improves the stability of the glass fiber reinforced polymeric spacer (5). The hollow body (9) is filled with a desiccant (8), which was introduced into the spacer (5) via an outer bored hole (10). The outer bored hole (10) can be situated either, as shown, in the outer surface (12) of the spacer (5) or, alternatively, even in one of the pane contact surfaces (13). A molecular sieve is used as the desiccant (8). The glazing interior surface (11) of the spacer (5) has openings (15), which are made at regular intervals circumferentially along the glazing interior surface (11) in order to enable a gas exchange between the glazing interior (3) and the hollow chamber (9). Thus, any atmospheric moisture present in the glazing interior (3) is absorbed by the desiccant (8). The openings (15) are implemented as slits with a width of 0.2 mm and a length of 2 mm. The glazing interior (3) is filled with argon. A primary sealant (4) with a thickness of 0.2 mm, which seals the gap between the pane (1, 2) and the spacer (5), is introduced between a respective contact surface (13) and the adjacent pane (1, 2). The primary sealant (4) is polyisobutylene with a penetration index of 50-70. A secondary sealant (6), which fills the external interpane space (14) in its entire width between the first pane (1) and the second pane (2), is applied on the outer surface (12) of the spacer (5), with both the primary sealant (4) and the external surface (12) of the spacer (5) being completely covered. Thus, even the outer bored hole (10) of the spacer (5) is sealed by the secondary sealant (6). The secondary sealant (6) is polyisobutylene with a penetration index of 36. The thickness of the secondary sealant (6) in the external interpane space (14) is 2 mm. Both the primary sealant (4) and the secondary sealant (6) are gas and water impermeable and thus form redundant protection of the glazing interior (3) against the entry of moisture and the escape of argon. Since the secondary sealant (6) has a lower penetration index and, thus, greater hardness than the primary sealant (4), the secondary sealant (4) does not start to flow even in the event of heating, e.g., as a result of strong solar radiation, whereas the softer primary sealant (4) does have such an undesirable flow behavior. The use of a soft primary sealant (4) is, however, necessary since a hard material is not flexible enough in the processing operation to fill the narrow gap between the spacer (5) and the adjacent panes (1, 2) uniformly and without defect. Accordingly, the properties of the sealant used are to be selected depending on the field of application. Through the selection of a soft material with a high penetration index as the primary sealant (4) and a harder material with a lower penetration index as the secondary sealant (6) and their synergy, the insulating glazing unit according to the invention can thus be further improved. A tertiary sealant (7), which serves to bond the first pane (1) and the second pane (2), is applied on the secondary sealant (6) in the external interpane space (14). The tertiary sealant (7) is silicone and is introduced into the external interpane space (14) in a thickness of 10 mm. The tertiary sealant (7) ends flush with the pane edges of the first pane (1) and the second pane (2). The tertiary sealant (7) is permeable to gas and water, but is, due to its very good adhesion on glass, of enormous importance for the mechanical stability of the insulating glazing unit.

FIG. 3 depicts a flowchart of one possible embodiment of the method according to the invention. First, a spacer (5) is installed, via a primary sealant (4), between a first pane (1) and a second pane (2), by inserting a primary sealant (4) between the pane contact surfaces (13) of the spacer (5) and the panes (1, 2). The glazing interior (13) can optionally be filled with a protective gas. During the subsequent pressing of the pane arrangement, the primary sealant (4) is uniformly distributed in the gap between the spacer (5) and the adjacent pane (1, 2) and seals them. The primary sealant (4) is applied, for example, as a round strand with a diameter of 1 mm to 2 mm and has, after pressing, a thickness of, for example, 0.2 mm. To support such processing, it is advantageous to use a soft material with a penetration index of 45 to 100 as the primary sealant (4). After the pressing of the pane arrangement, a secondary sealant (6), which is directly flush adjacent the spacer (5), is introduced first into the external interpane space (14). Thereafter, a tertiary sealant (7) is introduced into the external interpane space (14) adjacent the secondary sealant (6), with the tertiary sealant (7) ending flush with the edges of the panes (1, 2). The secondary sealant (6) and the tertiary sealant (7) are preferably extruded directly into the external interpane space (14).

LIST OF REFERENCE CHARACTERS 1 first pane
2 second pane
3 glazing interior
4 primary sealant
5 spacer
6 secondary sealant
7 tertiary sealant
8 desiccant
9 hollow chamber
10 outer bored hole
11 glazing interior surface
12 outer surface
13 pane contact surfaces
14 external interpane space
15 openings

The invention claimed is:
1. An insulating glazing unit, comprising:
a first pane and a second pane,
a spacer between the first pane and the second pane, the spacer comprising a glazing interior surface, an external surface, and two pane contact surfaces,
a glazing interior bordered by inner faces of the first pane and of the second pane and a glazing interior surface of the spacer,
an external interpane space adjacent the first pane, the second pane, and the external surface,
a primary sealant fixed between one pane contact surface and the first pane as well as between the other pane contact surface and the second pane,
a secondary sealant in the external interpane space, fixed between the first pane and the second pane adjacent the external surface, and
a tertiary sealant in the external interpane space, fixed between the first pane and the second pane adjacent the secondary sealant,
wherein the penetration index of the primary sealant is between 45 and 100 and the penetration index of the secondary sealant is between 20 and 40, with the penetration index being referred to ISO 2137-DIN 5180 and measured at a temperature of 60° C.

2. The insulating glazing unit according to claim 1, wherein the secondary sealant and the primary sealant contain components selected from the group consisting of butyl rubber, polyisobutylene, polyethylene vinyl alcohol, ethylene vinyl acetate, polyolefin rubber, and copolymers.

3. The insulating glazing unit according to claim 1, wherein the tertiary sealant contains components selected from the group consisting of polysulfides, silicones, silicone rubber, polyurethanes, polyacrylates, and copolymers.

4. The insulating glazing unit according to claim 1, wherein a penetration index of the secondary sealant is less than a penetration index of the primary sealant.

5. The insulating glazing unit according to claim 1, wherein thickness of the secondary sealant is from 0.5 mm to 5 mm.

6. The insulating glazing unit according to claim 1, wherein thickness of the tertiary sealant is from 2 mm to 30 mm.

7. The insulating glazing unit according to claim 1, wherein the insulating glazing unit additionally includes at least a third pane.

8. The insulating glazing unit according to claim 7, wherein the third pane is situated between the first pane and the second pane.

9. The insulating glazing unit according to claim 7, further comprising an additional spacer fixed on the first pane and/or the second pane parallel to the spacer situated between the first pane and the second pane.

10. The insulating glazing unit according to claim 1, wherein the spacer contains polymers and/or metals.

11. The insulating glazing unit according to claim 1, wherein the first pane and/or the second pane contain glass and/or polymers.

12. A method for producing an insulating glazing unit, comprising:
    a) fixing a spacer on a first pane and a second pane by way of a primary sealant on each pane contact surface of the spacer thus forming an intermediate arrangement, the intermediate arrangement further comprising
        a glazing interior bordered by inner faces of the first pane and of the second pane and a glazing interior surface of the spacer, and
        an external interpane space adjacent the first pane, the second pane, and the external surface,
    b) pressing the intermediate arrangement,
    c) filling a secondary sealant into the external interpane space, and
    d) filling a tertiary sealant into the external interpane space,
        wherein the penetration index of the primary sealant is between 45 and 100 and the penetration index of the secondary sealant is between 20 and 40, with the penetration index being referred to ISO 2137-DIN 5180 and measured at a temperature of 60° C.

13. The method according to claim 12, wherein step a) and step c) are performed simultaneously and the secondary sealant and the primary sealant are applied simultaneously.

14. A glazing comprising the insulating glazing unit of claim 1, said glazing being a building interior glazing, a building exterior glazing, or a façade glazing.

* * * * *